(12) United States Patent
Fujiwara

(10) Patent No.: US 8,606,332 B2
(45) Date of Patent: *Dec. 10, 2013

(54) GRAVITY AXIS DETERMINATION APPARATUS AND MOBILE TERMINAL APPARATUS USING THE SAME

(71) Applicant: LAPIS Semiconductor Co., Ltd., Tokyo (JP)

(72) Inventor: Kazunori Fujiwara, Tokyo (JP)

(73) Assignee: Lapis Semiconductor Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/792,287

(22) Filed: Mar. 11, 2013

(65) Prior Publication Data

US 2013/0186198 A1    Jul. 25, 2013

Related U.S. Application Data

(63) Continuation of application No. 12/591,432, filed on Nov. 19, 2009, now Pat. No. 8,412,277.

(30) Foreign Application Priority Data

Nov. 21, 2008    (JP) .................................. 2008-297923

(51) Int. Cl.
    *H04M 1/00*    (2006.01)
(52) U.S. Cl.
    USPC ........................................ 455/566; 455/550.1

(58) Field of Classification Search
    USPC ..................................... 455/550.1, 566.2, 566
    See application file for complete search history.

(56) References Cited

U.S. PATENT DOCUMENTS

| | | | |
|---|---|---|---|
| 7,783,449 B2 * | 8/2010 | Tronconi et al. | 702/141 |
| 8,103,263 B2 * | 1/2012 | Shim et al. | 455/418 |
| 2006/0213267 A1 * | 9/2006 | Tronconi et al. | 73/510 |
| 2009/0002391 A1 * | 1/2009 | Williamson et al. | 345/619 |
| 2009/0240461 A1 * | 9/2009 | Makino et al. | 702/141 |
| 2010/0073284 A1 * | 3/2010 | Dods et al. | 345/156 |
| 2010/0088061 A1 * | 4/2010 | Horodezky et al. | 702/141 |
| 2010/0103096 A1 * | 4/2010 | Yamamoto et al. | 345/157 |

FOREIGN PATENT DOCUMENTS

| | | |
|---|---|---|
| JP | 11-190743 A | 7/1999 |
| JP | 2000-056893 A | 2/2000 |
| JP | 2000-122635 A | 4/2000 |
| JP | 2005-215031 A | 8/2005 |
| JP | 2008-131616 A | 6/2008 |
| JP | 2008-269603 A | 11/2008 |

* cited by examiner

*Primary Examiner* — Ping Hsieh
(74) *Attorney, Agent, or Firm* — Rabin & Berdo, P.C.

(57) ABSTRACT

A gravity axis determination apparatus which can determine the gravity direction in a short time. The apparatus is low in cost and has a simple construction. Data values of acceleration data trains in a same time zone are mutually compared and one of the three axes is determined as a gravity axis.

6 Claims, 5 Drawing Sheets

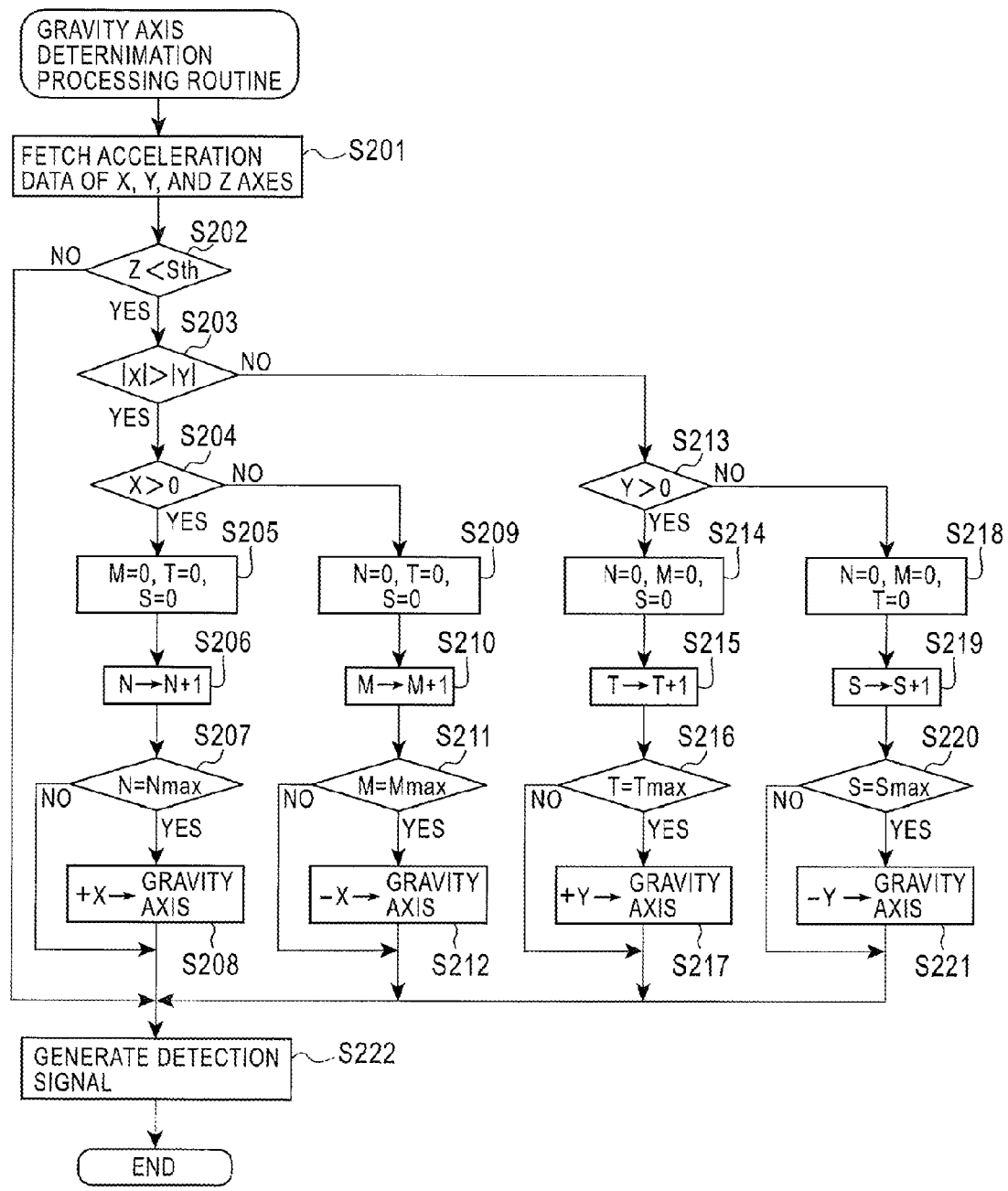

GRAVITY AXIS DETERMINATION APPARATUS AND MOBILE TERMINAL APPARATUS USING THE SAME

CROSS-REFERENCE TO RELATED APPLICATIONS

This application is a continuation of application Ser. No. 12/591,432, filed on Nov. 19, 2009. Furthermore, this application claims the benefit of priority of Japanese application 2008-297923, filed Nov. 21, 2008. The disclosures of these prior U.S. and Japanese application are incorporated herein by reference.

BACKGROUND OF THE INVENTION

1. Field of the Invention

The invention relates to a gravity axis determination apparatus for determining a gravity axis on the basis of acceleration in each axis and also to a mobile terminal apparatus using the gravity axis determination apparatus.

2. Description of the Related Arts

In recent years, portable mobile terminal apparatuses such as cellular phones and music players that have a display for displaying still images and motion images have widely been spread. Among such terminal apparatuses, there are apparatuses having a function for displaying images in such a way that a direction of a display screen on the display is fixed to a predetermined direction irrespective of whether the terminal itself is placed in the longitudinal direction or in the lateral direction. For example, a mobile terminal apparatus in which a degree of inclination and a direction of the mobile terminal are detected and an image is displayed on a display screen on the basis of a virtual display screen region obtained from the degree of inclination and the direction has been disclosed in Japanese Patent Kokai No. 2000-56893 (Patent Literature 1).

Ordinarily, terminals performing the displaying process have an acceleration sensor for detecting a magnitude and a direction of an acceleration of each of an X axis, a Y axis, and a Z axis and discriminates a direction of gravity on the basis of the acceleration of each axis. A process for obtaining a direction of a gravity acceleration by using the acceleration sensor is also used in a car navigation apparatus or the like which can be classified into the mobile terminal apparatus. For example, Japanese patent kokai No. 11-190743 (Patent Literature 2) discloses a triaxial acceleration detecting apparatus for mounting in a mobile body and which obtains an inclination angle and an inclination direction of the mobile body on the basis of an acceleration in a Z-axis direction and obtains a component in an X-axis direction of a gravity acceleration from the inclination angle and the inclination direction.

SUMMARY OF THE INVENTION

In the inventions disclosed in Patent Literatures 1 and 2 mentioned above, however, there is a problem that a predetermined time is needed until a discrimination result is obtained, since the inclination angle and the inclination direction of the terminal or the mobile body are calculated when the direction of the gravity is determined. Since it is necessary to provide a circuit for executing a calculating process, there also is a problem of increase of circuit scale which results in cost increase.

The invention has been made in view of the problems as mentioned above and it is an object of the invention to provide a gravity axis determination apparatus which can discriminate a direction of gravity in a short time and has a low-cost and simple construction, and to provide a mobile terminal apparatus using the gravity axis determination apparatus.

According to the invention, there is provided a gravity axis determination apparatus for determining and detecting one of three axes constituting a three-dimensional space as a gravity axis, comprising: a signal generating part for generating at least two axis acceleration signals each indicating an acceleration in each of directions of at least two axes among the three axes; a fetching part for fetching each of the axis acceleration signals as at least two axis acceleration data trains; and a determining and detecting part for comparing data values of the axis acceleration data trains in a same time zone, determining one of the three axes as the gravity axis, and generating a detection signal indicating the gravity axis.

According to the invention, there also is provided a mobile terminal apparatus including an image display part, comprising: a signal generating part for generating at least two axis acceleration signals each indicating an acceleration in each of directions of at least two axes among three axes constructing a three dimensional space; a fetching part for fetching each of the axis acceleration signals as at least two axis acceleration data trains; a determining and detecting part for comparing data values of the axis acceleration data trains in a same time zone, determining one of the three axes as the gravity axis, and generating a detection signal indicating the gravity axis; and an image display control part for allowing the image display part to display an image corresponding to image data in horizontal and vertical directions according to the detection signal.

According to the gravity axis determination apparatus of the invention, the gravity axis can be determined by a low-cost and simple construction in a short time. According to the mobile terminal apparatus of the invention, the image can be displayed onto the monitor so that it can be easily seen.

BRIEF DESCRIPTION OF THE PREFERRED EMBODIMENTS

FIG. 7 is a flowchart indicating an example of another gravity axis discrimination processing routine.

DETAILED DESCRIPTION OF THE PREFERRED EMBODIMENTS

An embodiment according to the invention will be described below in detail with reference to the drawings.

Figure 1:
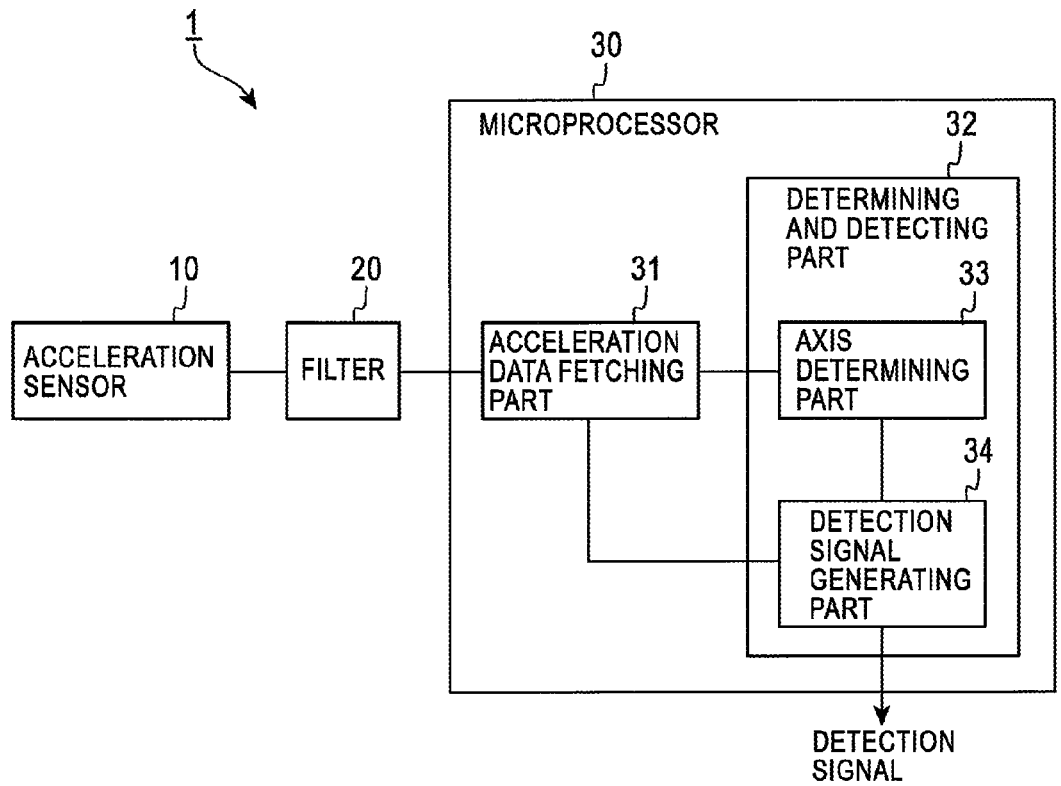
FIG. 1 is a block diagram indicating a gravity axis determination apparatus according to an embodiment of the present invention.

FIG. 1 is a block diagram indicating a gravity axis determination apparatus 1 in the embodiment. The gravity axis determination apparatus 1 is built in a personal digital assistant (hereinbelow, abbreviated to PDA) such as a cellular phone handset and is used to adjust a displaying direction of a display screen on a display in accordance with a direction and an inclination of the terminal itself. The gravity axis determination apparatus 1 includes an acceleration sensor 10, a filter 20, a microprocessor 30, and a monitor 40.

The acceleration sensor 10 is a triaxial acceleration sensor for generating three axis acceleration signals each indicating magnitude and direction of acceleration in each of an X axis, a Y axis, and a Z axis constructing a three-dimensional space. The acceleration sensor 10 is, for example, an MEMS (micro electro mechanical systems) acceleration sensor obtained by forming an acceleration detecting mechanism by a semiconductor process. The detecting mechanism of the MEMS acceleration sensor may be one of a piezoresistance type, an electrostatic capacitance type, and a thermo-sensitive type. The sensor has such performance that a range of, for example, ± a few grams can be measured and it can follow an acceleration fluctuation within a range from 0 Hz to about a few hundreds Hz.

Figure 2:
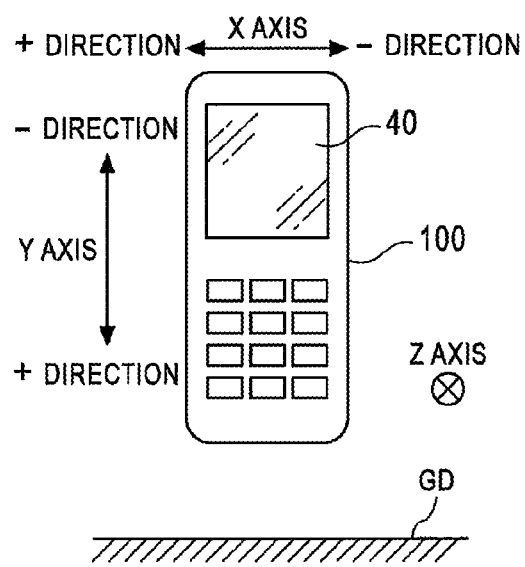
FIG. 2 is a diagram indicating a correspondence between a cellular phone handset and acceleration axes.

The acceleration sensor 10 generates the axis acceleration signal in which, for example, a signal level is indicated by a range of ±1 with respect to each of the X axis, the Y axis, and the Z axis. That is, the direction of the acceleration is indicated by the sign of ± and the magnitude of the acceleration is indicated by its absolute value. The gravity axis determination apparatus 1 is built, for example, in a cellular phone handset 100 as shown in FIG. 2. The X axis and the Y axis cross perpendicularly each other. The Y axis corresponds to a longitudinal direction of the cellular phone handset 100 and the X axis corresponds to a lateral direction, respectively. The Z axis corresponds to a thickness direction (which perpendicularly crosses an XY plane) of the cellular phone handset 100.

The acceleration sensor 10 generates the axis acceleration signal of the signal level according to the direction (inclination) of the cellular phone handset 100. In the X axis, when a right side of the cellular phone handset 100 faces a ground GD, it shows the signal level of −, and when a left side faces the ground GD, it shows the signal level of +. In the Y axis, when an upper side of the cellular phone handset 100 faces the ground GD, it shows the signal level of −, and when a lower side faces the ground GD, it shows the signal level of +. In the Z axis, when a front side (the side where the monitor 40 exists) of the cellular phone handset 100 faces the ground GD, it shows the signal level of −, and when a back side faces the ground GD, it shows the signal level of +.

For example, if the cellular phone handset 100 is fixed so that its lower side faces the ground GD as illustrated in the diagram, the signal level of each of the X axis and the Z axis is equal to 0 and the signal level of the Y axis is equal to +1. If the cellular phone handset 100 is rotated clockwise by 90° from the direction shown in the diagram and fixed, the signal level of each of the Y axis and the Z axis is equal to 0 and the signal level of the X axis is equal to −1. In addition, in accordance with the direction (inclination) of the cellular phone handset 100, the acceleration sensor 10 generates the axis acceleration signal in which the signal level is indicated in the range of ±1 with respect to each of the X axis, the Y axis, and the Z axis.

The filter 20 is a low pass filter for removing frequency components of, for example, 200 Hz or higher contained in the axis acceleration signal of each of the X axis, the Y axis, and the Z axis from the acceleration sensor 10. There is a case where the user of the cellular phone handset 100 watches the image displayed on the monitor 40 while, for example, walking or running. Since the cellular phone handset 100 quivers in the longitudinal and lateral directions or rotates during the motion such as running, high frequency components are contained in the axis acceleration signal. If the displaying direction of the display screen was switched on the basis of the axis acceleration signal containing the high frequency components, since the displaying direction of the display screen is frequently switched and the displayed image becomes hard to see, the high frequency components are removed in order to avoid it.

Since the microprocessor 30 executes a routine according to a gravity axis determining program and discriminates the gravity axis, it includes an acceleration data fetching part 31 and a determining and detecting part 32. Details of the program will be described hereinafter with reference to FIG. 4.

The acceleration data fetching part 31 fetches the axis acceleration signal regarding each of the X axis, the Y axis, and the Z axis in which the high frequency components have been removed by the filter 20 as an axis acceleration data train consisting of axis acceleration data obtained by sampling the axis acceleration signal at a predetermined sampling interval. In other words, the acceleration data fetching part 31 samples an instantaneous value of the acceleration of each axis at the predetermined sampling interval, thereby obtaining the axis acceleration data train of each axis. As a data value of the axis acceleration data, a magnitude and a direction of the acceleration at the fetching point of time are indicated by a range of, for example, ±1. That is, the direction of the acceleration is indicated by the sign of ± and the magnitude of the acceleration is indicated by its absolute value. The axis acceleration data train is a data train consisting of a plurality of axis acceleration data. The filter 20 can be also realized by the microprocessor 30 in a software manner.

The sampling interval at which the acceleration data fetching part 31 obtains the axis acceleration data train can be properly set according to an application and a function of the terminal in which the gravity axis determination apparatus 1 has been mounted. For example, if the gravity axis determination apparatus 1 was mounted in the cellular phone handset 100 and used in common with a pedometer, since the user carries the cellular phone handset 100, the sampling interval is set based on a walking speed. Assuming that a maximum frequency of the walking is equal to 4 Hz, since an interval of one step is equal to 250 milliseconds, the acceleration data fetching part 31 obtains the axis acceleration data train at an interval shorter than it. In the case of measuring the number of steps further accurately, it is desirable to measure by detecting a change in acceleration at several points of time during the motion of one walking step. In the case of detecting the change in acceleration during the operation of one step at, for example, four points and measuring the number of steps, therefore, it is necessary to obtain the axis acceleration data train at an interval of 62.5 milliseconds. Since a larger number of acceleration changes per step can be obtained by measuring at a further short interval, the number of steps can be measured more accurately. It is desirable to measure at an interval of 30 milliseconds.

The determining and detecting part 32 discriminates the gravity axis and the gravity direction on the basis of the axis acceleration data train of each of the X axis, the Y axis, and the Z axis obtained by the acceleration data fetching part 31. The determining and detecting part 32 includes an axis determining part 33 and a detection signal generating part 34.

The axis determining part 33 mutually compares the magnitudes of the acceleration indicated by the axis acceleration data of the respective axes of the X axis, the Y axis, and the Z axis from the acceleration data fetching part 31 (hereinbelow, referred to as an acceleration comparison) and determines one of those axes as a gravity axis.

The axis determining part 33 discriminates the gravity axis on the basis of a result of at least one acceleration comparison. The number of times of the acceleration comparison for determining the gravity axis can be arbitrarily set.

If a mode in which the gravity axis is determined on the basis of the result of the one acceleration comparison was set, the axis determining part 33 mutually compares the absolute value of the acceleration of the X axis indicated by the X-axis acceleration data, the absolute value of the acceleration of the Y axis indicated by the Y-axis acceleration data, and the absolute value of the acceleration of the Z axis indicated by the Z-axis acceleration data which are derived from the acceleration data fetching part 31 in the same time zone and determines the axis corresponding to the acceleration of the largest absolute value as a gravity axis. For example, with respect to the magnitude of the acceleration indicated by the axis acceleration data from the acceleration data fetching part 31, assuming that the magnitude values in the X axis, the Y axis, and the Z axis are equal to −0.99, 0.05, and 0.07, respectively, the X axis corresponding to the largest absolute value is determined as a gravity axis.

If a mode in which the gravity axis is determined on the basis of the results of the acceleration comparison of a plurality of times was set, the axis determining part 33 mutually compares the X-axis acceleration data train, the Y-axis acceleration data train, and the Z-axis acceleration data train from the acceleration data fetching part 31 in a predetermined determining period of time and determines one of the X axis, the Y axis, and the Z axis as a gravity axis. In detail, if it is determined the predetermined number of times with lapse of time that the absolute value of the acceleration regarding one of the X axis, the Y axis, and the Z axis is larger than the absolute values of the acceleration of the other axes in the predetermined determining period of time, the one axis is determined as a gravity axis.

Figure 3:
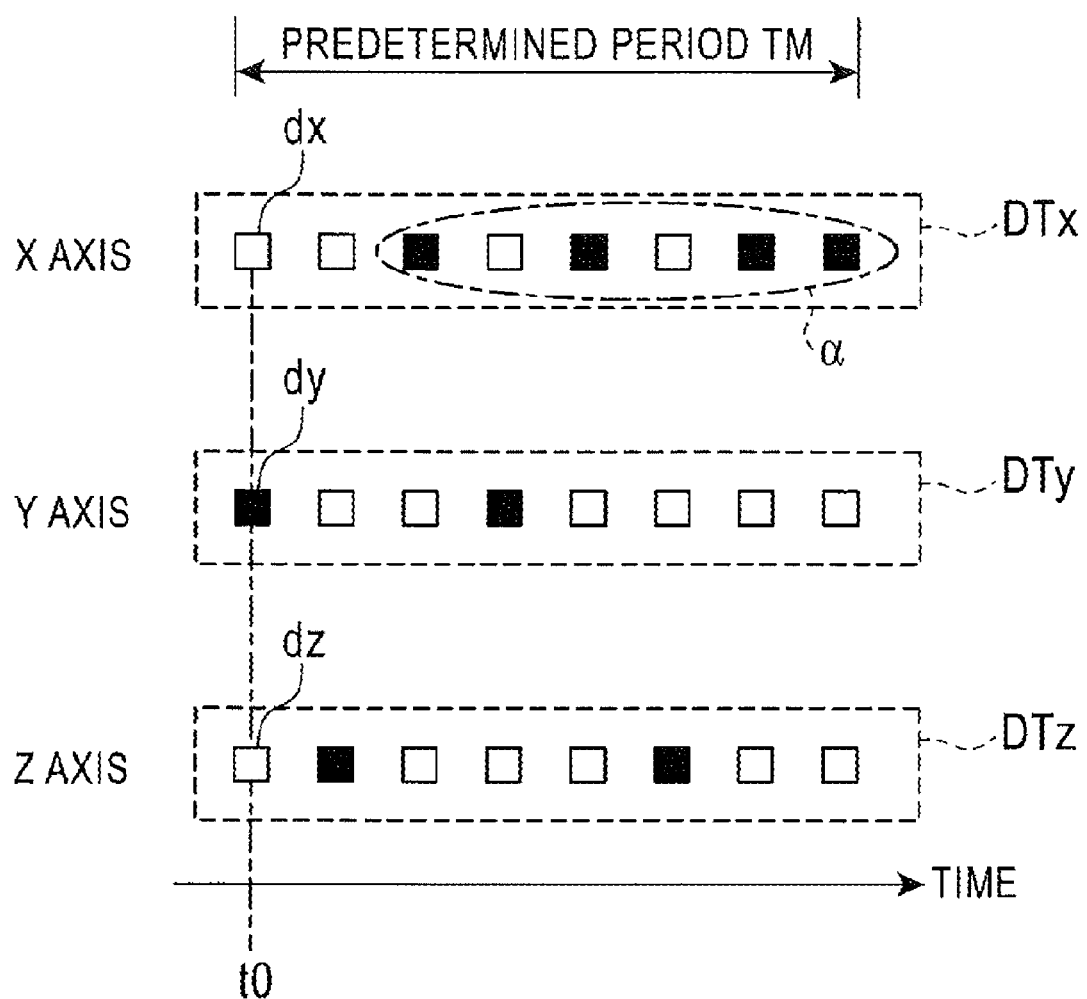
FIG. 3 is a time chart indicating an example of an axis acceleration data train of each of an X axis, a Y axis, and a Z axis.

FIG. 3 is a time chart indicating an example of axis acceleration data trains DTx, DTy, and DTz of the respective axes of the X axis, the Y axis, and the Z axis. The axis acceleration data train DTx consists of a plurality of axis acceleration data dx. The axis acceleration data train DTy consists of a plurality of axis acceleration data dy. The axis acceleration data train DTz consists of a plurality of axis acceleration data dz. Each of the axis acceleration data dx, dy, and dz is time sequentially shown in the direction of an axis of abscissa. In each of the axis acceleration data dx, dy, and dz, the absolute value of the acceleration regarding each corresponding axis is shown as a data value. The axis acceleration data in which the absolute value indicates the maximum acceleration among the axis acceleration data dx, dy, and dz is indicated by a square painted in black. For example, the data indicating the maximum acceleration at time t0 of the same fetching timing by the acceleration data fetching part 31 is the axis acceleration data dy.

With respect to the axis acceleration data train fetched by the acceleration data fetching part 31 at an interval of, for example, 30 milliseconds, if the axis determining part 33 determines only the predetermined number of times such as four times that the absolute value of the acceleration regarding the X axis at the same fetching timing is larger than the absolute value of the acceleration of each of the Y axis and the Z axis in a predetermined determining period of time TM such as 240 milliseconds (α in the diagram), the X axis is determined as a gravity axis.

It is also possible to construct in such a manner that the axis determining part 33 obtains the axis acceleration data of the respective axes of the X axis, the Y axis, and the Z axis from the acceleration data fetching part 31 at an interval of, for example, 30 milliseconds and performs the acceleration comparison, and if it is continuously determined only the predetermined number of times such as four times that the absolute value of the acceleration regarding the X axis at the same fetching timing is larger than the absolute value of the acceleration of each of the Y axis and the Z axis, the X axis is determined as a gravity axis. That is, when the X axis is the axis of the maximum acceleration for 120 milliseconds (=30 milliseconds×4) as at least a predetermined determining period of time, the axis determining part 33 determines that the X axis is the gravity axis.

Figure 4:
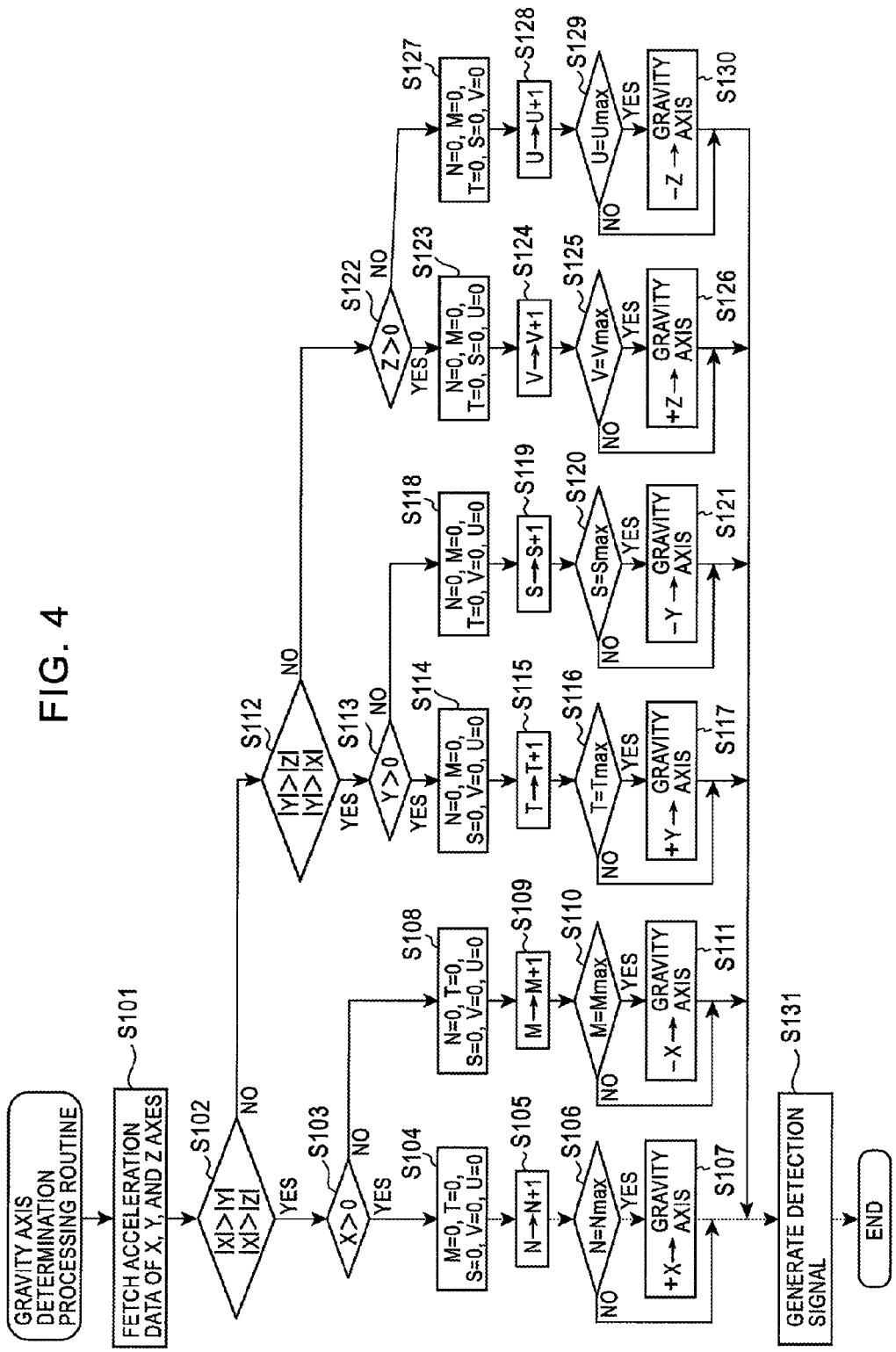
FIG. 4 is a flowchart indicating an example of a gravity axis discrimination processing routine.

FIG. 4 is a flowchart indicating an example of a gravity axis discrimination processing routine which is realized by executing the program by the microprocessor 30. The microprocessor 30 repeats the gravity axis discrimination processing routine at an interval of, for example, 30 milliseconds.

First, the acceleration data fetching part 31 fetches the axis acceleration data of each of the X axis, the Y axis, and the Z axis from the acceleration sensor 10 (step S101).

Subsequently, the axis determining part 33 mutually compares the absolute values of the acceleration indicated by the axis acceleration data of the respective axes of the X axis, the Y axis, and the Z axis. First, when the axis determining part 33 determines that the absolute value of the acceleration regarding the X axis is larger than the absolute value of the acceleration of each of the Y axis and the Z axis (the absolute value of the acceleration regarding the X axis is maximum) (step S102), it discriminates whether a sign of the acceleration of the X axis is equal to + or − (step S103). If it is decided that the sign of the acceleration of the X axis is equal to +, a count value M regarding the − direction of the X axis, a count value T regarding the + direction of the Y axis, a count value S regarding the − direction of the Y axis, a count value V regarding the + direction of the Z axis, and a count value U regarding the − direction of the Z axis are reset, that is, M=0, T=0, S=0, V=0, and U=0 (step S104) and, at the same time, +1 is added to a count value N regarding the + direction of the X axis (step S105). When the axis determining part 33 determines that the count value N has reached a predetermined discrimination value Nmax (step S106), it decides the X axis as a gravity axis and determines that the + direction of the X axis is a gravity direction (step S107).

The count value N is a value indicating the number of times of discrimination in the case where the axis determining part 33 has continuously determined that the acceleration in the + direction of the X axis is larger than the acceleration of each of the − direction of the X axis, the Y axis, and the Z axis. The predetermined discrimination value Nmax is a value indicating the predetermined number of times of discrimination necessary to decide that the + direction of the X axis is the gravity direction. The predetermined discrimination value Nmax (the predetermined number of times of discrimination) is equal to, for example, 4 times. In the case, when the axis determining part 33 continuously determines four times that the acceleration in the + direction of the X axis is maximum, it decides that the + direction of the X axis is the gravity direction. Even after completion of the gravity axis discrimination processing routine, the axis determining part 33 holds the count values N, M, T, S, V, and U and uses them upon execution of the next gravity axis discrimination processing routine.

When the axis determining part 33 determines in step S103 that the sign of the acceleration of the X axis is equal to −, the count values N, T, S, V, and U are reset, that is, N=0, T=0, S=0, V=0, and U=0 (step S108) and, at the same time, +1 is added to the count value M regarding the − direction of the X axis (step S109). When the axis determining part 33 determines that the count value M has reached a predetermined discrimination value Mmax (step S110), it decides the X axis as a gravity axis and determines that the − direction of the X axis is the gravity direction (step S111). The predetermined discrimination value Mmax is a value indicating the predetermined number of times of discrimination necessary to decide that the − direction of the X axis is the gravity direction.

When the axis determining part 33 determines in step S102 that the absolute value of the acceleration of the X axis is not maximum, the processing routine advances to step S112. When the axis determining part 33 determines that the absolute value of the acceleration of the Y axis is larger than the absolute value of the acceleration of each of the Z axis and the X axis (the absolute value of the acceleration of the Y axis is maximum) (step S112), it discriminates whether a sign of the acceleration of the Y axis is equal to + or − (step S113). When the axis determining part 33 determines that the sign of the acceleration of the Y axis is equal to +, the count values N, M, S, V, and U are reset, that is, N=0, M=0, S=0, V=0, and U=0 (step S114) and, at the same time, +1 is added to the count value T regarding the + direction of the Y axis (step S115). When the axis determining part 33 determines that the count value T has reached a predetermined discrimination value Tmax (step S116), it decides the Y axis as a gravity axis and determines that the + direction of the Y axis is the gravity direction (step S117). The count value T is a value indicating the number of times of discrimination in the case where the axis determining part 33 has continuously determined that the acceleration in the + direction of the Y axis is larger than the acceleration of each of the − direction of the Y axis, the Z axis, and the X axis. The predetermined discrimination value Tmax is a value indicating the predetermined number of times of discrimination necessary to decide that the + direction of the Y axis is the gravity direction.

When the axis determining part 33 determines in step S113 that the sign of the acceleration of the Y axis is equal to −, the count values N, M, T, V, and U are reset, that is, N=0, M=0, T=0, V=0, and U=0 (step S118) and, at the same time, +1 is added to the count value S regarding the − direction of the Y axis (step S119). When the axis determining part 33 determines that the count value S has reached a predetermined discrimination value Smax (step S120), it decides the Y axis as a gravity axis and determines that the − direction of the Y axis is the gravity direction (step S121). The predetermined discrimination value Smax is a value indicating the predetermined number of times of discrimination necessary to decide that the − direction of the Y axis is the gravity direction.

When the axis determining part 33 determines in step S112 that the absolute value of the acceleration of the Y axis is not maximum, the processing routine advances to step S122. The axis determining part 33 determines that the absolute value of the acceleration of the Z axis is larger than the absolute value of the acceleration of each of the Y axis and the X axis (the absolute value of the acceleration of the Z axis is maximum), and discriminates whether a sign of the acceleration of the Z axis is equal to + or − (step S122). When the axis determining part 33 determines that the sign of the acceleration of the Z axis is equal to +, the count values N, M, T, S, and U are reset, that is, N=0, M=0, T=0, S=0, and U=0 (step S123) and, at the same time, +1 is added to the count value V regarding the + direction of the Z axis (step S124). When the axis determining part 33 determines that the count value V has reached a predetermined discrimination value Vmax (step S125), it decides the Z axis as a gravity axis and determines that the + direction of the Z axis is the gravity direction (step S126). The count value V is a value indicating the number of times of discrimination in the case where the axis determining part 33 has continuously determined that the acceleration in the + direction of the Z axis is larger than the acceleration of each of the − direction of the Z axis, the X axis, and the Y axis. The predetermined discrimination value Vmax is a value indicating the predetermined number of times of discrimination necessary to decide that the + direction of the Z axis is the gravity direction.

When the axis determining part 33 determines in step S122 that the sign of the acceleration of the Z axis is equal to −, the count values N, M, T, S, and V are reset, that is, N=0, M=0, T=0, S=0, and V=0 (step S127) and, at the same time, +1 is added to the count value U regarding the − direction of the Z axis (step S128). When the axis determining part 33 determines that the count value U has reached a predetermined discrimination value Umax (step S129), it decides the Z axis as a gravity axis and determines that the − direction of the Z axis is the gravity direction (step S130). The predetermined discrimination value Umax is a value indicating the predetermined number of times of discrimination necessary to decide that the − direction of the Z axis is the gravity direction.

The detection signal generating part 34 receives the axis acceleration data of the respective axes of the X axis, the Y axis, and the Z axis from the acceleration data fetching part 31 and generates a detection signal indicating that the direction of the acceleration regarding the axis (one of the X axis, the Y axis, and the Z axis) which has been determined as a gravity axis by the axis determining part 33, that is, one of the six kinds of directions of the + direction of the X axis, the − direction of the X axis, the + direction of the Y axis, the − direction of the Y axis, the + direction of the Z axis, and the − direction of the Z axis is the gravity direction (step S131).

Figure 5:
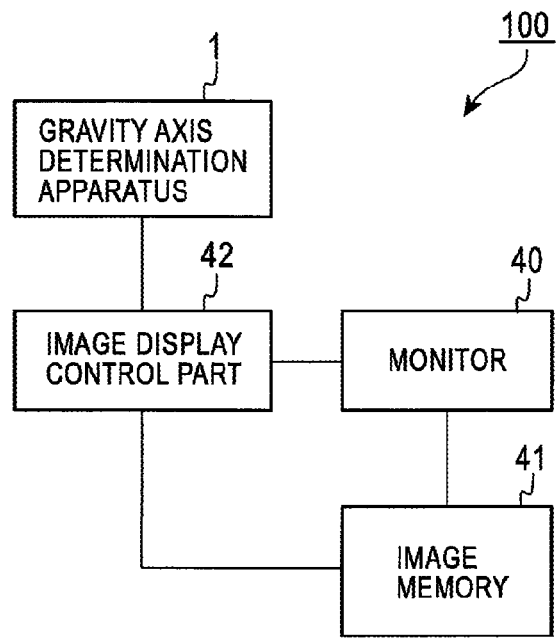
FIG. 5 is a block diagram indicating the cellular phone handset in which the gravity axis determination apparatus is mounted.

FIG. 5 is a block diagram indicating the cellular phone handset 100 in which the gravity axis determination apparatus 1 is mounted. The cellular phone handset 100 includes the gravity axis determination apparatus 1, the monitor 40, an image storing memory 41, and an image display control part 42.

The monitor 40 is, for example, a display and displays an image based on image data stored in the image storing memory 41. The image storing memory 41 is a memory such as a RAM for storing the image data. The image display control part 42 is, for example, a microprocessor or the like for allowing the image according to the image data stored in the image storing memory 41 to be displayed onto the monitor 40 in the horizontal and vertical directions according to the detection signal from the gravity axis determination apparatus 1.

Figure 6A:
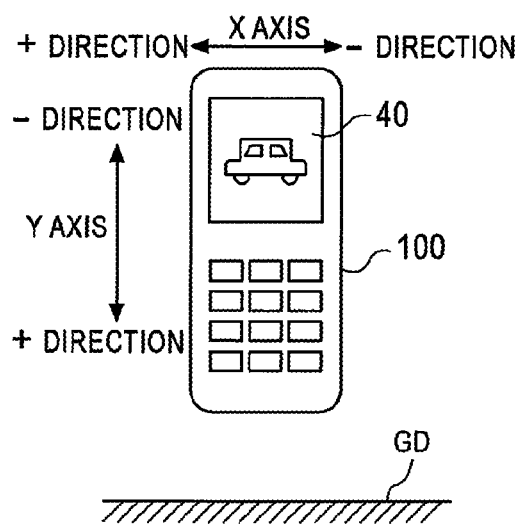
FIGS. 6A and 6B are diagrams indicating a correspondence between a direction of the cellular phone handset and a display screen.
Figure 6B:
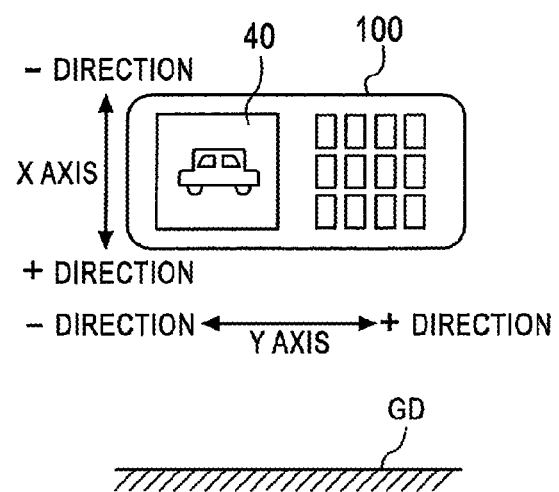

The image display control part 42 allows the monitor 40 to display the image in the horizontal and vertical directions decided on the basis of the gravity direction indicated by the detection signal from the detection signal generating part 34 included in the gravity axis determination apparatus 1. In the case where, for example, the gravity direction is equal to the + direction of the Y axis, the image display control part 42 allows the monitor 40 to display a display screen as illustrated in FIG. 6A. In the case where the gravity direction is equal to the + direction of the X axis, the image display control part 42 allows the monitor 40 to display the display screen as depicted in FIG. 6B. That is, the monitor 40 switches the display screen so that the direction of the image faces the ground in a predetermined direction and displays the image.

For example, if the cellular phone handset 100 has been held in such a manner that both of the vertical direction (Y-axis direction) and the lateral direction (X-axis direction) of the cellular phone handset 100 are inclined for the ground at an angle near 45°, the magnitude of the acceleration of the Y axis and the magnitude of the acceleration of the X axis are equal to almost the same value. In the case, the axis corresponding to the maximum acceleration (referred to a maximum acceleration axis hereinbelow) is frequently switched between the X axis and the Y axis. That is, if the axis determining part 33 determined the gravity axis on the basis of the result of one acceleration comparison, the axis which is decided as a gravity axis is frequently switched between the X axis and the Y axis. In the case where only when the axis determining part 33 has continuously determined only the predetermined number of discrimination times by the gravity axis determining process as mentioned above that one axis is the maximum acceleration axis, the axis is decided as a gravity axis, the gravity axis is not frequently switched and the gravity axis can be determined at high precision.

As mentioned above, according to the gravity axis determination apparatus of the embodiment, the absolute values of the acceleration of the respective axes of the X axis, the Y axis, and the Z axis are mutually compared and the axis corresponding to the acceleration of the largest absolute value is decided as a gravity axis. According to the invention, therefore, since there is no need to calculate the inclination angle and the inclination direction of the terminal in order to discriminate the gravity axis, the gravity axis determination apparatus in which the gravity direction can be determined in a short time, the circuit construction can be simplified, and the costs are low can be constructed.

According to the embodiment, in the case where it has been determined only the predetermined number of discrimination times in the predetermined period of time that the absolute value of the acceleration regarding one of the X axis, the Y axis, and the Z axis is larger than the absolute values of the acceleration of the other axes, the one axis is decided as a gravity axis. In the case where, for example, the terminal is inclined so that each of the X axis and the Y axis is inclined for the ground at an angle near 45° and the axis of the maximum acceleration has frequently been switched between the X axis and the Y axis in a very short time, therefore, the discrimination result of the gravity axis is not changed but becomes constant. In the case, therefore, since the direction of the display screen which is displayed on the display of the terminal is stable without being frequently switched between the X axis and the Y axis, the display screen which can be easily seen by the user can be displayed.

Although the example in which when it has continuously been determined only four times that the absolute value of the acceleration regarding one axis is larger than the absolute values of the acceleration of the other axes, the one axis is decided as a gravity axis has been mentioned above, the number of discrimination times is not limited but can be properly set in accordance with the application and function of the terminal in which the gravity axis determination apparatus is mounted.

Although the magnitudes of the acceleration of three axes of the X axis, the Y axis, and the Z axis are mutually compared and the gravity axis is determined in the example mentioned above, it is also possible to mutually compare the magnitudes of the acceleration of the two axes among them and to discriminate the gravity axis. For example, in the case where the gravity axis determination apparatus is mounted in the cellular phone handset, when the direction of the display screen of the display is changed on the basis of the discrimination result of the gravity axis, if one of the two axes of the X axis and the Y axis is determined as a gravity axis, the direction of the display screen can be switched.

An example of a gravity axis discrimination processing routine in the case is shown in FIG. 7. The fetching process of the axis acceleration data of each of the X axis, the Y axis, and the Z axis (step S201) is similar to that of the foregoing example. Subsequently, whether or not the magnitude of the acceleration of the Z axis is smaller than a predetermined value such as 0.866 is determined (step S202). That is, the acceleration detection result about the Z axis is used only to discriminate whether or not an angle between the display screen of the cellular phone handset and the ground is equal to or larger than a predetermined angle such as 30°. It is not used for comparison between the X axis and the Y axis. The angle between the display screen of the cellular phone handset and the ground can be also determined by using only the X axis and the Y axis. In the case, when the angle is equal to 30°, the magnitudes of the acceleration of the X axis and the Y axis are equal to 0.5. When the magnitude of the acceleration of the Z axis is smaller than the predetermined value, the absolute values of the acceleration of the X axis and the Y axis are compared (step S203). The subsequent processes (steps S204 to S222) are executed in a manner similar to those mentioned above and one of the + direction of the X axis, the − direction of the X axis, the + direction of the Y axis, and the − direction of the Y axis is determined as a gravity direction.

Although the foregoing embodiment relates to the example in the case where the gravity axis determination apparatus has been mounted in the cellular phone handset, for example, a similar effect can be also obtained in the case where the gravity axis determination apparatus has been mounted in another mobile terminal apparatus such as a portable personal computer.

What is claimed is:

1. A gravity axis determination method for determining and detecting one of three axes constructing a three-dimensional space as a gravity axis, comprising:
generating at least two axis acceleration signals each indicating an acceleration in each of directions of at least two axes among said three axes;
and
fetching each of said axis acceleration signals as at least two axis acceleration data trains,
wherein when it is determined a plurality of times consecutively that an axis acceleration data value in one of said axis acceleration data trains is larger than an axis acceleration data value in one of axis acceleration data trains other than said one axis acceleration data train in said same time zone, the axis corresponding to said one axis acceleration data train is determined as said gravity axis.

2. A method according to claim 1, wherein said plurality of times is at least four times.

3. A method according to claim 2, wherein each of said acceleration signals is fetched at uniform intervals.

4. A method according to claim 3, wherein high frequency components of said axis acceleration signal are removed.

5. A method according to claim 2, wherein high frequency components of said axis acceleration signal are removed.

6. A method according to claim 1, wherein high frequency components of said axis acceleration signal are removed.

* * * * *